US007606976B2

(12) United States Patent
Raghuvanshi (10) Patent No.: US 7,606,976 B2
(45) Date of Patent: Oct. 20, 2009

(54) DYNAMICALLY SCALABLE CACHE ARCHITECTURE

(75) Inventor: Preetham Raghuvanshi, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 355 days.

(21) Appl. No.: 11/553,560

(22) Filed: Oct. 27, 2006

(65) Prior Publication Data

US 2008/0104324 A1    May 1, 2008

(51) Int. Cl.
    *G06F 12/00*    (2006.01)
(52) U.S. Cl. ....................... 711/118; 711/154
(58) Field of Classification Search ........................ None
    See application file for complete search history.

(56) References Cited

U.S. PATENT DOCUMENTS

| 5,761,715 | A  | * | 6/1998  | Takahashi ................. 711/128 |
| 5,787,292 | A  | * | 7/1998  | Ottesen et al. ............. 713/300 |
| 7,127,560 | B2 | * | 10/2006 | Cohen et al. .............. 711/141 |
| 7,136,984 | B2 | * | 11/2006 | Maiyuran et al. ........... 711/173 |
| 7,395,372 | B2 | * | 7/2008  | Correale et al. ............ 711/128 |
| 7,437,513 | B2 | * | 10/2008 | Saida et al. ............... 711/128 |
| 7,478,218 | B2 | * | 1/2009  | Bruening et al. ........... 711/170 |
| 7,506,099 | B2 | * | 3/2009  | Iwanari et al. ............. 711/104 |
| 2003/0145239 | A1 | * | 7/2003  | Kever et al. .............. 713/300 |
| 2004/0054851 | A1 | * | 3/2004  | Acton et al. .............. 711/118 |
| 2005/0080994 | A1 | * | 4/2005  | Cohen et al. .............. 711/118 |
| 2005/0097277 | A1 | * | 5/2005  | Maiyuran et al. .......... 711/128 |
| 2006/0077845 | A1 | * | 4/2006  | Nakai ...................... 369/53.22 |
| 2007/0168624 | A1 | * | 7/2007  | Kaler ...................... 711/154 |
| 2008/0040547 | A1 | * | 2/2008  | Abadeer et al. ............ 711/128 |

OTHER PUBLICATIONS

Albonesi, David H., "Selective Cache Ways: On-Demand Cache Resource Allocation," In Proceedings of the 32nd Annual IEEE/ACM International Symposium on Microarchitecture (MICRO 32), Nov. 1999, pp. 248-259.

Flautner, Krisztian et al., "Drowsy Caches: Simple Techniques for Reducing Leakage Power," in Proceedings of the 29th Annual International Symposium on Computer Architecture, IEEE CS Press, 2002, pp. 148-157.

Hennessy, John L and Patterson, David A., "Memory Hierarchy Design," in Computer Architecture a Quantitative Approach, Morgan Kaufmann Publishers, San Francisco, CA, 3rd Edition, 2003, Chapter 5, Sections 5.1 and 5.2, pp. 390-406.

(Continued)

*Primary Examiner*—Jack A Lane
(74) *Attorney, Agent, or Firm*—Zagorin O'Brien Graham LLP (57) ABSTRACT

A technique for managing power consumption of a cache memory system dynamically adjusts the size of the cache memory system according to an energy level of an energy storage device. In at least one embodiment of the invention, an apparatus includes a dynamically scalable cache memory circuit including at least one cache memory circuit having an effective cache size selectable from a plurality of cache sizes. The apparatus includes a control circuit responsive to an energy level indicator of at least an approximate energy level of an energy storage device configured to provide energy to the dynamically scalable cache memory circuit. The control circuit is configured to select the effective cache size based at least in part on the energy level indicator.

28 Claims, 10 Drawing Sheets

OTHER PUBLICATIONS

Nii, Koji et al., "A Low Power SRAM Using Auto-Backgate-Controlled MT-CMOS," In Proceedings of the 1998 International Symposium on Low Power Electronics and Design, Aug. 1998, pp. 293-298.

Powell, Michael et al., "Gated-Vdd: A Circuit Technique to Reduce Leakage in Deep-Submicron Cache Memories," In Proceedings of the 2000 International Symposium on Low Power Electronics and Design, IEEE/ACM 2000, pp. 90-95.

Yang, Se-Hyun et al., "An Integrated Circuit/Architecture Approach to Reducing Leakage in Deep-Submicron High-Performance I-Caches," In Proceedings of the 7th International Symposium on High-Performance Computer Architecture, IEEE, 2001, 11 pages.

Yang, Se-Hyun et al., "Exploiting Choice in Resizable Cache Design to Optimize Deep-Submicron Processor Energy-Delay," In Proceedings of the Eighth International Symposium on High-Performance Computer Architecture (HPCA•02), 2002, 11 pages.

* cited by examiner

DYNAMICALLY SCALABLE CACHE ARCHITECTURE

BACKGROUND

1. Field of the Invention

The present invention relates to integrated circuit memory systems, and more particularly to cache memory systems.

2. Description of the Related Art

In typical hierarchical memory systems, cache memories are small, fast memory circuits that store most-recently accessed code or data to reduce the latency (i.e., the total time between the start and completion) of references to memory. As integrated circuit die sizes increase and integrated circuit manufacturing process geometries decrease, the size of a cache memory that may be implemented on an integrated circuit die increases, e.g., 100 megabytes (MB) or greater. In an exemplary processor architecture, a cache memory occupies a substantial portion of the processor area and the ratio of cache memory area to core logic area may increase in the future.

In general, as cache memory size increases, the total power dissipation (i.e., static power dissipation, e.g., power dissipation due to leakage current or other current drawn continuously from the power supply, and dynamic power dissipation, e.g., power dissipation due to switching transient currents and/or charging and discharging of load capacitances) of the cache memory increases, which typically reduces battery life in portable applications. As cache memory sizes increase and gate sizes decrease, static power dissipation increases and may become a larger portion of total power dissipation.

SUMMARY

A technique for managing power consumption of a cache memory system dynamically adjusts the size of the cache memory system according to an energy level of an energy storage device. In at least one embodiment of the invention, an apparatus includes a dynamically scalable cache memory circuit including at least one cache memory circuit having an effective cache size selectable from a plurality of cache sizes. The apparatus includes a control circuit responsive to an energy level indicator of at least an approximate energy level of an energy storage device configured to provide energy to the dynamically scalable cache memory circuit. The control circuit is configured to select the effective cache size based at least in part on the energy level indicator.

In at least one embodiment of the invention, a method includes selectively providing power to a dynamically scalable cache memory circuit to select an effective size of a cache memory circuit in the dynamically scalable cache memory circuit. The selectively providing power is based at least in part on at least an approximate energy level of an energy storage device configured to provide energy to the dynamically scalable cache memory circuit.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
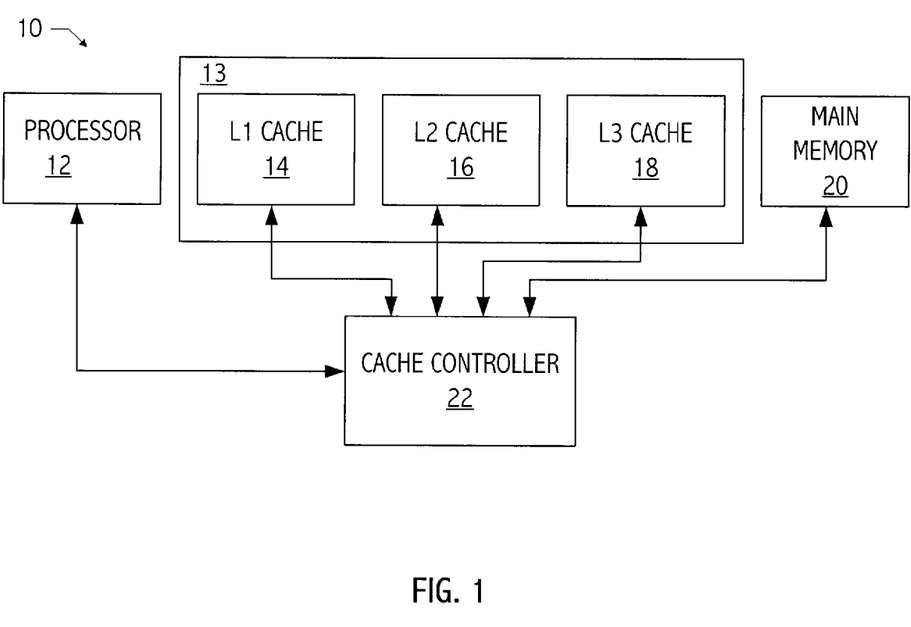
FIG. 1 illustrates a hierarchical memory system consistent with one or more embodiments of the present invention.

Referring to FIG. 1, a typical hierarchical memory system (e.g., memory system 10) includes a cache (e.g., cache 13), a main memory (e.g., main memory 20), a cache control circuit (e.g., cache controller 22), and one or more execution units and/or processors (e.g., processor 12). The execution unit or processor, cache control circuit, and cache may reside on a single integrated circuit. Cache 13 may be a single-level cache or a multi-level cache (e.g. a three level cache, as shown in FIG. 1). In general, the storage capacity of individual levels of a multi-level cache increases with increasing cache level while the cost and speed decrease with increasing cache level. The term "cache," as used hereinafter, refers to a single-level cache or at least one level of a multi-level cache (e.g., level-three of a three level cache), unless otherwise specified. The term "cache control circuit," as used herein, refers to a circuit, sub-circuit, or other device that controls the state of a corresponding cache. Although cache controller 22 is illustrated as being separate from processor 12, cache 13, and main memory 20, a cache control circuit may be included, for example, as part of a cache, execution unit or processor, or other portion of a system including a cache.

Due to a limited, although large, cache size, only a portion of the data available to the execution unit or processor can reside in the cache at a particular time. Typically, partial effective addresses, i.e., tags, indicate which data lines of main memory are present in the cache. The tags are stored in a tag memory, which is generally an array of memory smaller than the cache. When the processor attempts to access a specific location in main memory, the processor first accesses (or accesses in parallel to cache accesses) the tag memory to determine whether or not the contents of a particular memory location are present in the cache. If a particular effective address matches a tag, then the data line is present in the cache and a "cache hit" occurs. If the contents of the particular location in main memory are not present in the cache, a "cache miss" occurs and the processor fetches the contents from main memory.

In general, a memory system may be configured to map blocks from main memory into a particular cache memory according to n-way set associative mapping, direct-mapping, or fully associative mapping of an effective address to the cache memory. In a set associative mapping scheme, a small number of alternative locations may store a particular address within the cache to reduce contention with other addresses for presence in the cache. These locations are called a set. If n blocks are in a set, the cache is referred to as n-way set associative. An effective address associated with a particular block from main memory is first mapped onto one of the sets in the cache, then the block may be placed anywhere within that set. In a direct-mapping scheme, a particular block from main memory can be placed into only one block in the cache memory. Accordingly, a direct-mapped cache may be considered a one-way set associative cache having m sets. In a fully associative mapping scheme, a particular block from main memory cache can be placed into any block in the cache memory. A fully associative cache may be considered a cache having one set that is m-way set associative.

A technique for changing the power consumption (i.e., the rate at which the cache memory circuit expends energy) of a cache memory circuit includes dynamically changing the effective size of the cache memory circuit. Such a memory system is referred to herein as a dynamically scalable cache (i.e., DSC) memory system. Accordingly, changes in effective size of a circuit in a DSC memory system may change a performance level (e.g., cache hit rate, cache miss rate, and/or overall latency of the DSC memory system) of the DSC memory system for a particular application. Note that performance of a DSC memory system is application dependent, and particular changes in effective size of a circuit in the DSC memory system may not affect performance of the DSC memory system for a particular application. However, dynamically reducing the effective size of a cache memory circuit generally reduces dynamic and static power dissipation of the cache memory circuit.

A portable processor-based device (e.g., a laptop) typically receives power from an energy storage device (e.g., battery) with a limited power supply. Although the laptop may initially be configured with a DSC memory system having a first performance level and a first power consumption characteristic, in order to extend battery life, the memory system configuration may be changed from a configuration associated with the first performance level and first power consumption characteristic to a second configuration associated with a second performance level and second power consumption characteristic. In some applications, by trading off increased performance for increased operating time of the laptop may be beneficial to users of some applications. An exemplary memory system of a laptop computer includes a 50 Mega-Byte (MB) level two (L2), unified cache, a one MB level one (L1) instruction cache, and a 1 MB L1 data cache. The battery may have approximately one hour of battery life remaining at that particular performance level. If the laptop is executing an application that may tolerate a reduction in cache memory performance to reduce power dissipation and conserve battery life (e.g., using a word processing application to read a novel or draft a document), then the system may dynamically switch to another configuration associated with a lower performance level cache (e.g., 25 MB L2 cache) to increase the battery lifetime (e.g., two hours of battery life remaining). Four exemplary dynamically scalable cache (DSC) modes are illustrated in Table 1 for the exemplary DSC memory system.

TABLE 1

Dynamically Scalable Cache Modes

| DSC Mode | L2 Cache | L1 Instruction Cache | L1 Data Cache | Percentage of Cache Powered-Off |
|---|---|---|---|---|
| 0 | 50 MB | 1 MB | 1 MB | 0% |
| 1 | 25 MB | 512 KB | 1 MB | ~50% |
| 2 | 10 MB | 512 KB | 512 KB | ~79% |
| 3 | 2 MB | 256 KB | 256 KB | ~95% |

Note that this memory configuration is exemplary only and techniques described herein are applicable to various memory configurations.

In at least one embodiment of the invention, DSC mode 0 is the default mode having the entire cache memory operable and therefore consuming the most power of the four DSC modes. DSC modes 1, 2, and 3 reduce the operable portions of the memory system and accordingly, effectively reduce the amount of power consumption of the memory system. Mode 3 includes the smallest operable cache portions, approximately 95% of the cache array is powered off. Accordingly, mode 3 dissipates the least power of the four exemplary DSC modes.

In at least one embodiment of a DSC memory system, the DSC memory system switches between DSC modes dynamically, i.e., during program execution by a processor coupled to the DSC memory system. The dynamic switching of the DSC mode is based on an indication of energy remaining in an energy storage device and at least one target power consumption characteristic (e.g., the target power consumption characteristic may be a target lifetime of the remaining energy in the energy storage device, a target performance level of the DSC memory system, other suitable metric, or any combination thereof). The dynamic switching of the DSC mode can be initiated by software (e.g., the operating system of the processor), hardware (e.g., a processor, internal power management control circuit, or other suitable circuitry), other suitable technique, or any combination thereof.

Regardless of the technique used to initiate the dynamic switching of the DSC mode, criteria used to decide whether to initiate a particular switch may be based on the amount of power consumed by the switching function. For example switching DSC modes may include flushing valid cache lines to main memory (e.g., when switching to an effectively smaller-sized DSC memory) and re-synchronizing the processor internal pipelines before powering off unused cache portions. Additional power consumption considerations include power associated with switching to a larger or smaller effective cache size, e.g., the power consumed by switching on powered-off portions of a tag memory for the smaller effective cache sizes, the power consumed by switching on powered-off portions of the cache memory (e.g., when switching from a smaller effective cache size to a larger effective cache size), the power consumed by invalidating newly added cache arrays, and power consumed by re-synchronizing the processor pipeline before resuming instruction execution. In at least one embodiment of a DSC memory system, a potential reduction in power consumption of a DSC memory system due to a change in DSC mode must be greater that the power consumed by the DSC mode switch itself. Thus, DSC mode switching may be performed on a low frequency basis. For example, 10-15 minutes of operation or greater may pass before switching to a mode with a smaller effective cache size. Switching to a larger effective cache sized mode may be dependent upon whether the power supply has been replenished or user preferences for increased performance outweigh the benefits of reduced power consumption.

Figure 2A:
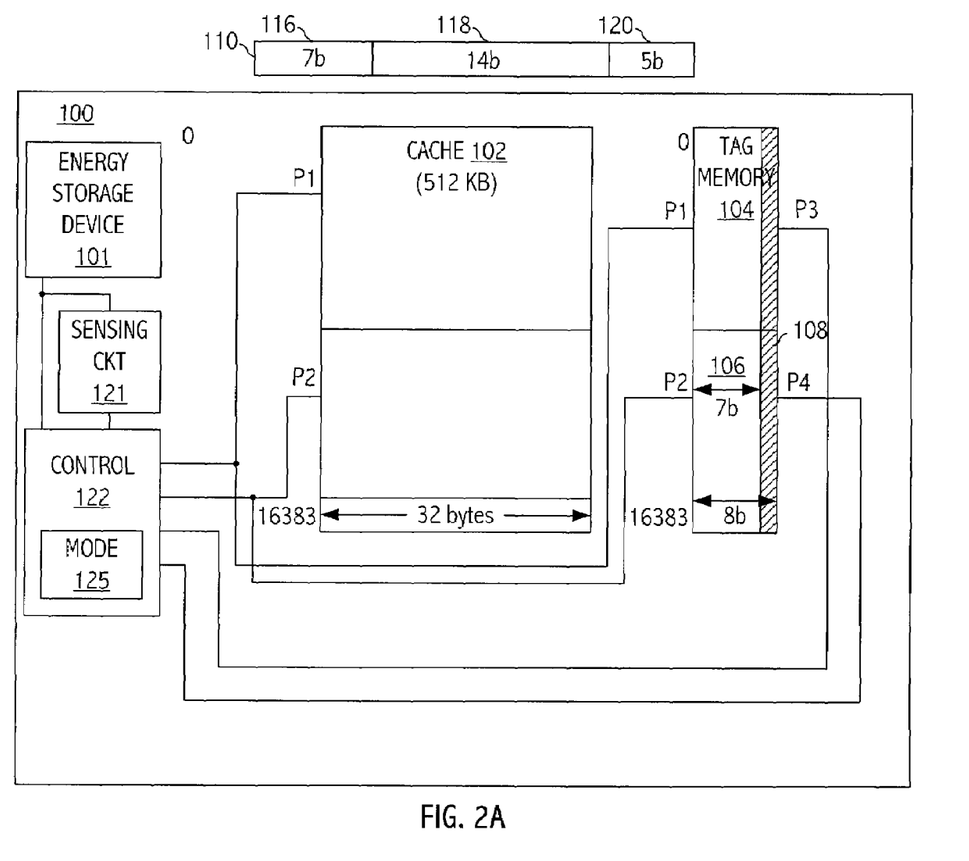
FIG. 2A illustrates a block diagram of a dynamically scalable cache memory system having a first configuration consistent with at least one embodiment of the invention.
Figure 2B:
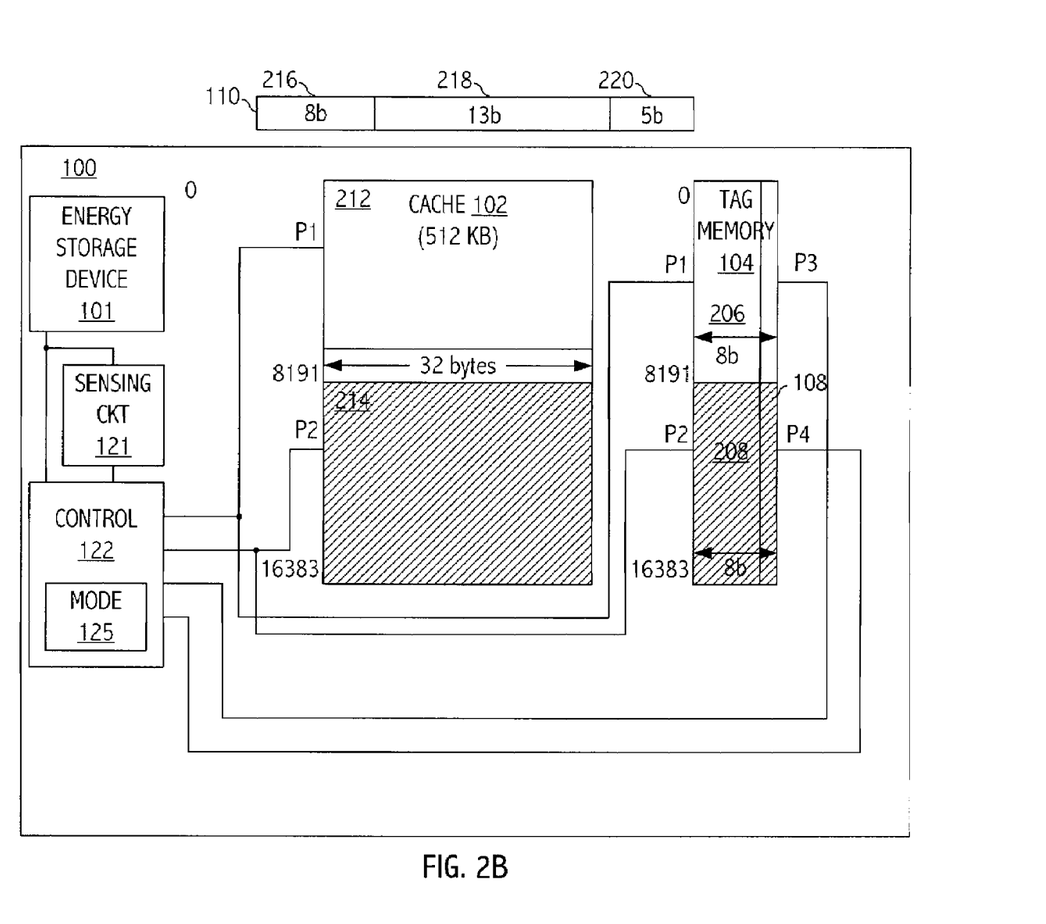
FIG. 2B illustrates a block diagram of the dynamically scalable cache memory system of FIG. 2A having a second configuration consistent with at least one embodiment of the invention.

Referring to FIGS. 2A and 2B, a processor 100 includes direct-mapped cache memory structure (e.g., cache memory 102) and a corresponding tag memory structure (e.g., tag memory 104). The exemplary DSC memory system includes a 64 MB main memory (not shown), a 512 KB direct-mapped cache (e.g., cache 102) having a cache line size of 32 bytes. In a first mode, the entire 512 KB of cache 102 is operable. The tag memory associated with cache 102 (e.g., tag memory 104) includes one entry for each of the 16,383 lines of cache 102. Cache 102 can be configured to support different effective cache sizes. Tag memory 104 is configurable to have an effective size corresponding to the effective size of cache 102. Each line of tag memory 104 is eight bits wide, however, note that only 7 bits of tag memory 102 are active for each of the 16,383 tag entries, i.e., tag memory 102 has an effectively enabled region (e.g., tag memory region 106) and an effectively disabled region (e.g., tag memory region 108). The main memory effective address (e.g., address 110) is 26 bits wide. Address 110 includes a seven-bit tag address 116, a 14-bit index 118, and a 5-bit block offset 120. For this direct-mapped cache, only one cache line can contain a particular line from main memory. Tag address 116 is compared to a corresponding seven-bit entry of tag memory 104 to determine whether or not the particular line of main memory is stored in the cache (i.e., to determine whether there is a "cache hit" or a "cache miss").

Two DSC configurations are illustrated with reference to the DSC memory system of processor 100, however, additional power modes may be implemented. The cache power modes include a full-cache memory mode (FIG. 2A) and a reduced-cache memory mode (FIG. 2B), which reduces the effective size of the cache memory structure. Cache 102 and tag memory 104 are coupled to a plurality of power supply nodes (e.g., P1, P2, P3, and P4). Although four separate power supply nodes are illustrated, the number of separate power supply nodes will vary according to memory system configuration and the number and type of power modes supported by the memory system. Power supply nodes P1, P2, P3, and P4 are selectively enabled by control circuit 122 to provide power to individual portions of cache memory circuit 102 and portions of tag memory circuit 104.

In the full-cache memory mode, control circuit 122 receives from sensing circuit 121, an indication of the remaining energy stored in energy storage device 101. Control circuit 122 may be any suitable integrated circuits included in processor 100. Sensing circuit 121 may be included in processor 100 or external to processor 100, e.g., in the energy storage device 101. Sensing circuits are well known in the art and sensing circuit 121 may be any suitable integrated circuit. Functions attributed to control circuit 122 may be distributed across a processor pipeline, execution units, or other circuits of processor 100 (e.g., cache controller) and may be adapted to any particular computer architecture. The power mode of the cache is determined by control circuit 122 based at least in part on the indication of remaining energy and a target power consumption characteristic (e.g., lifetime of energy storage device 101 at a current DSC configuration) and a mode indicator may be generated (e.g., mode indicator 125). Power supply nodes P1, P2, P3, and P4 are configured according to the selected mode of the DSC memory system as indicated by the mode indicator. In the full-cache memory mode, power supply nodes P1 and P2 supply power to portions of cache memory circuit 102 and portions of tag memory circuit 104. Since in the full-cache memory mode less bits are needed for the tag address than for the reduced-cache memory mode, power supply nodes P3 and P4 are configured to effectively power off (e.g., P3 and P4 are configured as ground nodes) portions of tag memory circuit 104, as indicated by shaded portions of tag memory circuit 104. Although individual power supply nodes are illustrated, portions of cache memory circuit 102 and tag memory circuit 104 may be effectively enabled and disabled by selectively coupling those portions to a particular power supply node, or by other suitable techniques.

Referring to FIG. 2B, cache 102 is configured in a power savings mode having an effectively operable cache region (e.g., cache region 212) and an effectively disabled cache region (e.g., cache region 214). Tag memory 104 has a corresponding configuration including an effectively operable tag region (e.g., tag region 206), which is eight bits wide, and effectively disabled tag region (e.g., tag region 208). Effective address 110 includes an eight-bit tag address 216, a 13-bit index 218, and a 5-bit block offset 220, which are used consistent with techniques described above with reference to FIG. 2A.

Power supply nodes P1, P2, P3 and P4 are individually configured according to mode indicator 125, which indicates the reduced-cache memory mode. Power supply node P1 supplies power to portions of cache memory circuit 102 and portions of tag memory circuit 104. Power supply node P2 effectively powers off portions of cache memory circuit 102 and portions of tag memory circuit 104, as indicated by the shaded portion of cache memory circuit 102 and shaded portions of tag memory circuit 104. Power supply node P3 supplies power to portions of tag memory circuit 104 that are operable to support the reduced, effective cache memory sizes. Power supply node P4 is configured to effectively power off portions of tag memory circuit 104, as indicated by shaded portions of tag memory circuit 104. Note that the portions of tag memory circuit 104 that are coupled to power supply node P4 are not enabled in cache power mode 1 or in cache power mode 2. Accordingly, in at least one embodiment of the DSC memory system, power supply node P4 is not present and the portion of tag memory circuit 104 that is coupled to power supply node P4 is eliminated or coupled to ground. However, those portions of tag memory circuits 104 may be included in the DSC memory system to improve manufacturability of tag memory circuit 104, or to provide support for other modes of the DSC memory system.

Figure 3A:
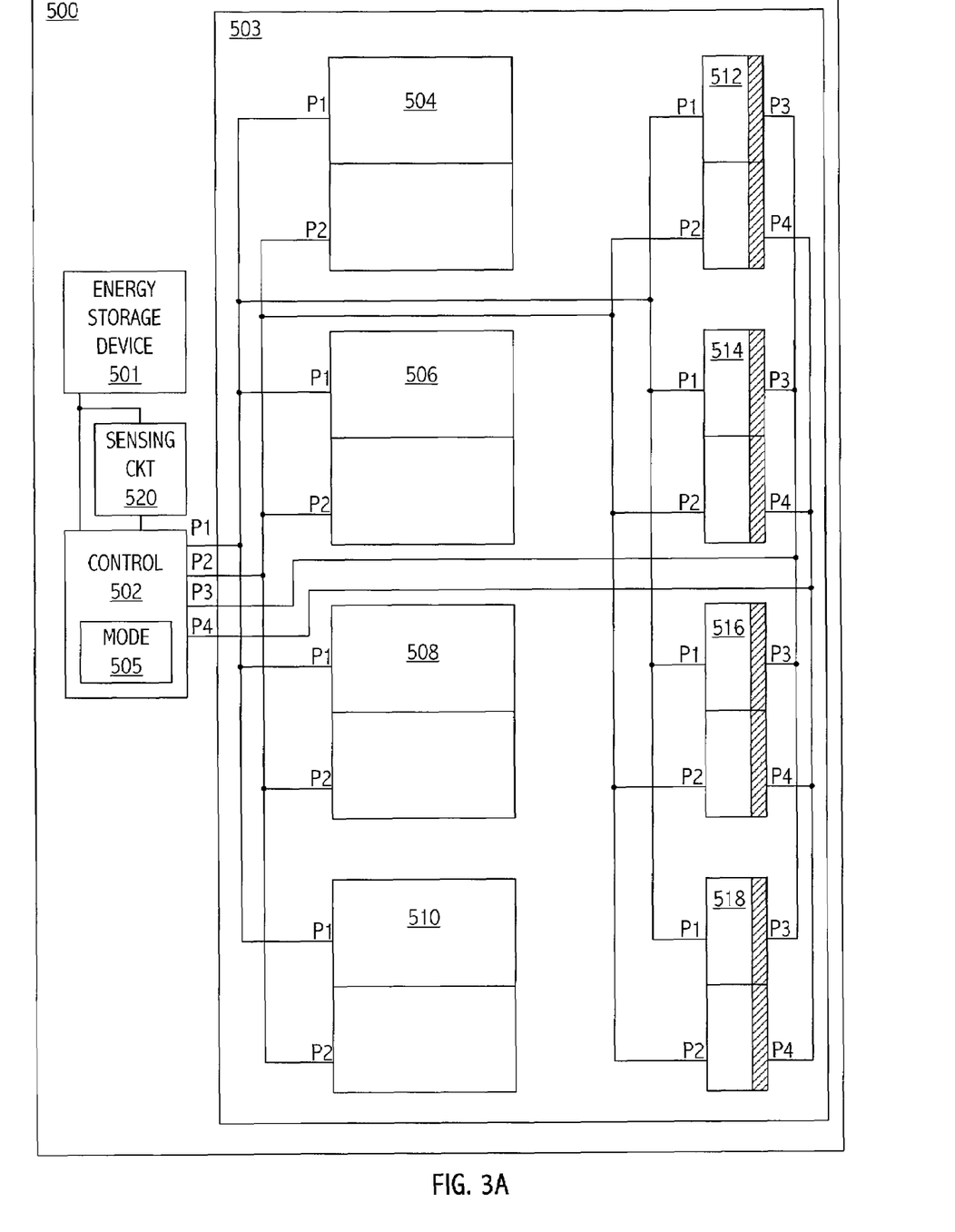
FIG. 3A illustrates a block diagram of a dynamically scalable cache memory system having a first configuration consistent with at least one embodiment of the invention.
Figure 3B:
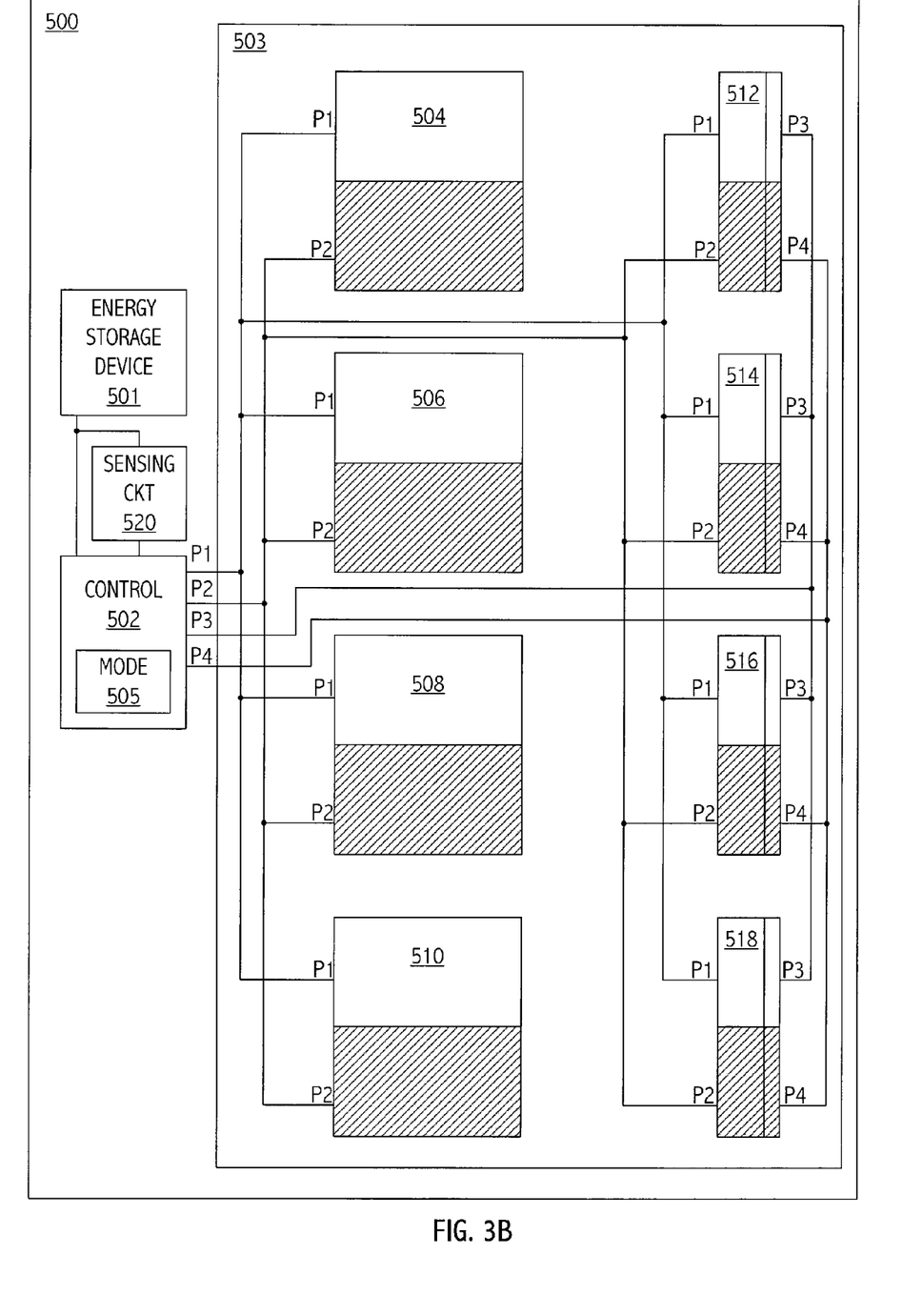
FIG. 3B illustrates a block diagram of the dynamically scalable cache memory system of FIG. 3A having a second configuration consistent with at least one embodiment of the invention.

Referring to FIGS. 3A and 3B, a processor 500 includes an n-way set associative cache memory structure (e.g., cache memories 504, 506, 508, and 510) and a corresponding tag memory structure (e.g., tag memories 512, 514, 516, and 518) in memory system 503. For a set-associative cache, an index is used to select which set is to be checked in the cache memory circuit. Only one cache line of a particular set can contain the particular line from main memory. The entry in the tag memory circuit that corresponds to that particular line in the cache memory circuit is compared to the seven-bit tag address to determine whether or not the particular line of main memory is stored in the cache memory circuit. A block offset is used to select the desired data from a particular block of cache 102 (i.e., selects a particular byte from an individual cache line of cache 102).

Two DSC configurations are illustrated with reference to memory system 503, however, additional power modes may be implemented. The cache power modes include a full-cache memory mode (FIG. 3A) and a reduced-cache memory mode (FIG. 3B), which reduces the effective size of each set of the cache memory structure. Memory system 503 is coupled to a plurality of power supply nodes (e.g., P1, P2, P3, and P4). Although four separate power supply nodes are illustrated, the number of separate power supply nodes will vary according to memory system configuration and the number and type of power modes supported by the memory system. Power supply nodes P1, P2, P3, and P4 are individually selectively enabled by control circuit 502 to provide power to individual portions of cache memory circuits 504, 506, 508, and 510 and tag memory circuits 512, 514, 516, and 518.

In the full-cache memory mode, control circuit 502 receives from sense circuit 520, an indication of the remaining energy stored in energy storage device 501. Control circuit 502 may be any suitable integrated circuit included in processor 500. Functions attributed to control circuit 502 may be distributed across a processor pipeline, execution units, or other circuits of processor 500 (e.g., cache controller) and may be adapted to any particular computer architecture. The power mode of the cache in memory system 503 is determined by control circuit 502 based, at least in part, on the indication of remaining energy and a target power consumption characteristic. Power supply nodes P1, P2, P3, and P4 are configured according to the selected mode of memory system 503, which may be indicated by a mode indicator (e.g., mode indicator 505).

Referring to FIG. 3A, in the full-cache memory mode, power supply nodes P1 and P2 supply power to portions of cache memory circuits 504, 506, 508, and 510 and tag memory circuits 512, 514, 516, and 518. Since in the full-cache memory mode less bits are needed for the tag address than for the reduced-cache memory mode, power supply nodes P3 and P4 are configured to effectively power off (e.g., P3 and P4 are configured as ground nodes) portions of tag memory circuits 512, 514, 516, and 518, as indicated by shaded portions of tag memory circuits 512, 514, 516, and 518.

Referring to FIG. 3B, power supply nodes P1, P2, P3 and P4 are configured according to mode indicator 505, which indicates the reduced-cache memory mode. Power supply node P1 supplies power to portions of cache memory circuits 504, 506, 508, and 510 and portions of tag memory circuits 512, 514, 516, and 518. Power supply node P2 effectively powers off portions of cache memory circuits 504, 506, 508, and 510 and portions of tag memory circuits 512, 514, 516, and 518, as indicated by the shaded portions of cache memory circuits 504, 506, 508, and 510 and shaded portions of tag memory circuits 512, 514, 516, and 518. Power supply node P3 supplies power to portions of tag memory circuits 512, 514, 516, and 518 that are operable to support the reduced, effective cache memory sizes. Power supply node P4 is configured to effectively power off portions of tag memory circuits 512, 514, 516, and 518, as indicated by shaded portions of tag memory circuits 512, 514, 516, and 518. Note that the portions of cache memory circuits 512, 514, 516, and 518 that are coupled to power supply node P4 are not enabled in cache power mode 1 or in cache power mode 2. Accordingly, in at least one embodiment of memory system 503, power supply node P4 is not present and the portions of tag memory circuits 512, 514, 516, and 518 that are coupled to power supply node P4 are eliminated or coupled to ground. However, those portions of tag memory circuits 512, 514, 516, and 518 may be included in memory system 503 to improve manufacturability of tag memory circuits 512, 514, 516, and 518, or to provide support for other modes of memory system 503.

Figure 4A:
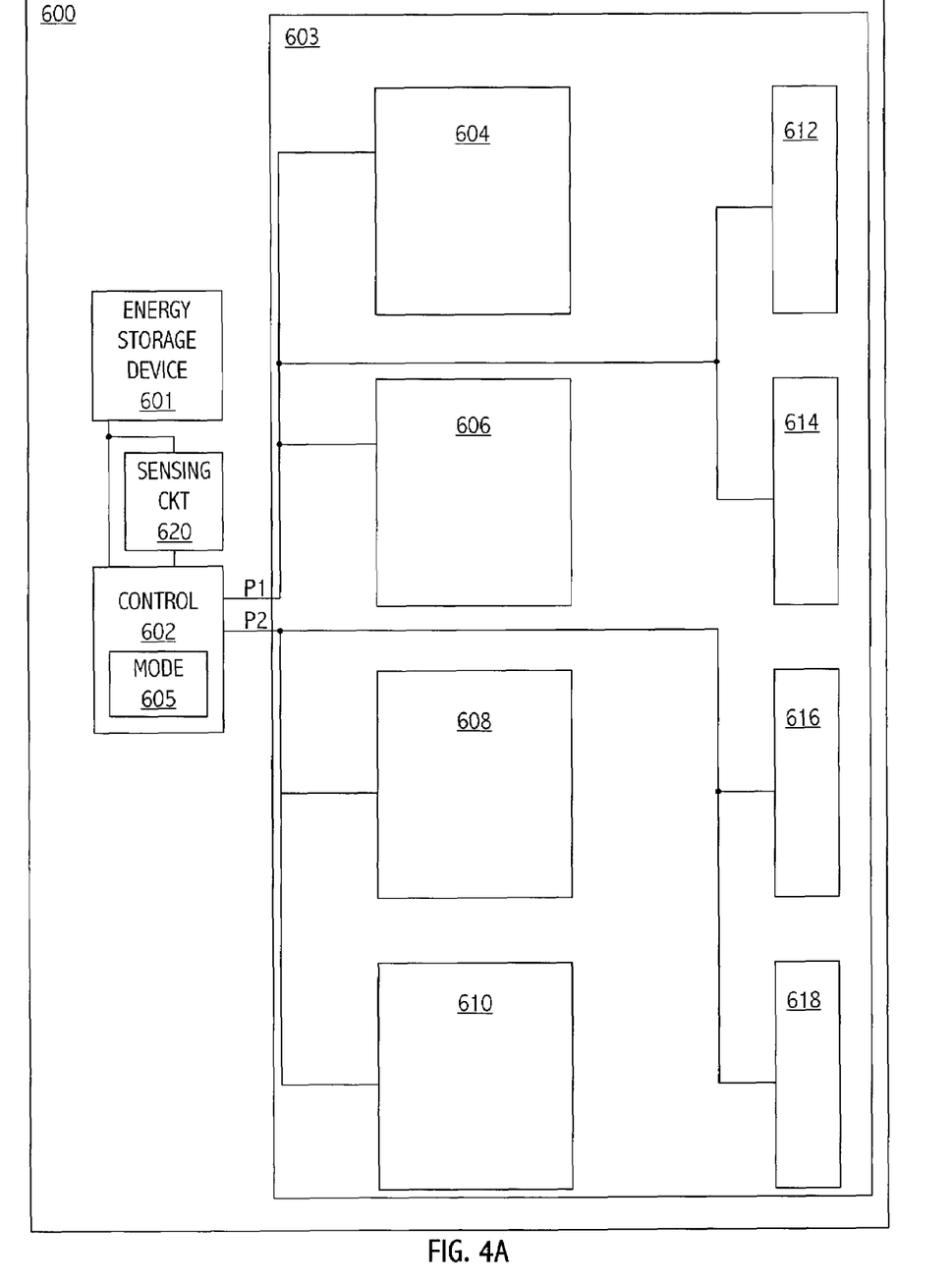
FIG. 4A illustrates a block diagram of a dynamically scalable cache memory system having a first configuration consistent with at least one embodiment of the invention.
Figure 4B:
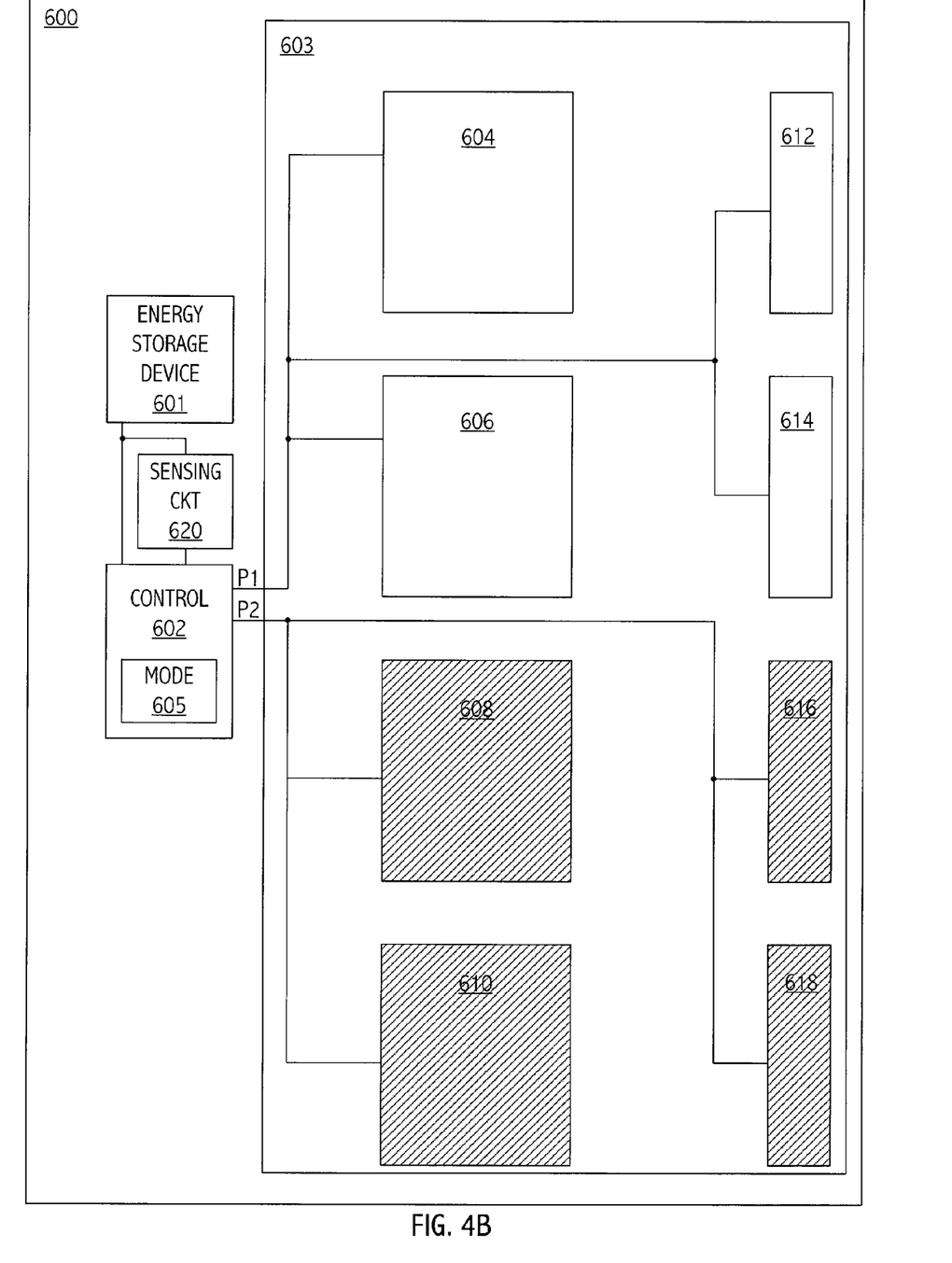
FIG. 4B illustrates a block diagram of the dynamically scalable cache memory system of FIG. 4A having a second configuration consistent with at least one embodiment of the invention.

Referring to FIG. 4A and 4B, a processor (e.g., processor 600) includes an n-way set associative cache memory structure (e.g., cache memories 604, 606, 608, and 610) and a corresponding tag memory structure (e.g., tag memories 612, 614, 616, and 618) in memory system 603. Two DSC configurations are illustrated with reference to memory system 603, however, additional power modes may be implemented. The cache power modes include a full-cache memory mode (FIG. 4A) and a reduced-cache memory mode (FIG. 4B), which reduces the number of sets of the cache memory structure from four sets to two sets and adjusts the effective size of the tag memory structure accordingly. Memory system 603 is coupled to a plurality of power supply nodes (e.g., P1 and P2). Although two separate power supply nodes are illustrated, the number of separate power supply nodes will vary according to memory system configuration and the number and type of power modes supported by the memory system. Power supply nodes P1 and P2 are selectively enabled by control circuit 602 to provide power to individual portions of cache memory circuits 604, 606, 608, and 610 and portions of tag memory circuits 612, 614, 616, and 618.

Referring to FIG. 4A, in the full-cache memory mode, power supply nodes P1 and P2 supply power to cache memory circuits 604, 606, 608, and 610 and tag memory circuits 612, 614, 616, and 618 to configure memory system 603 to include an n-way set associative cache having four sets. Referring to FIG. 4B, power supply nodes P1 and P2 are configured according to mode indicator 605, which indicates the reduced-cache memory mode that configures memory system 603 as an n-way set associative cache having two sets. Power supply node P1 supplies power to cache memory circuits 604 and 606 and tag memory circuits 612 and 614. Power supply node P2 effectively powers off cache memory circuits 608 and 610 and tag memory circuits 616 and 618, as indicated by the shading of those circuits.

Figure 5A:
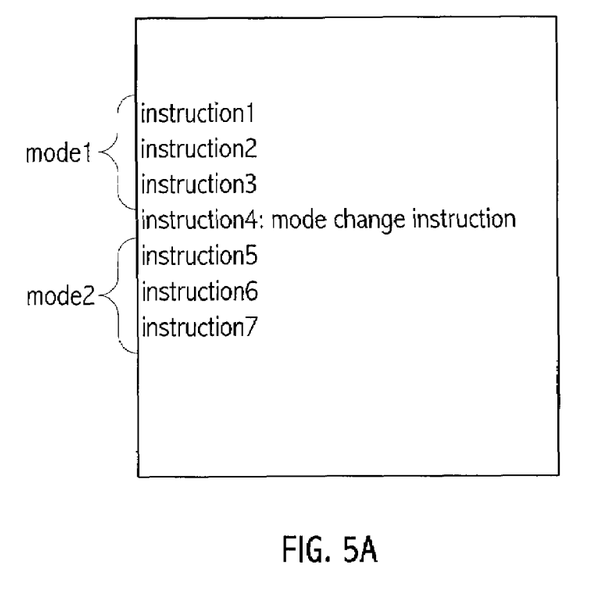
FIG. 5A illustrates an exemplary instruction execution sequence consistent with at least one embodiment of the invention.
Figure 5B:
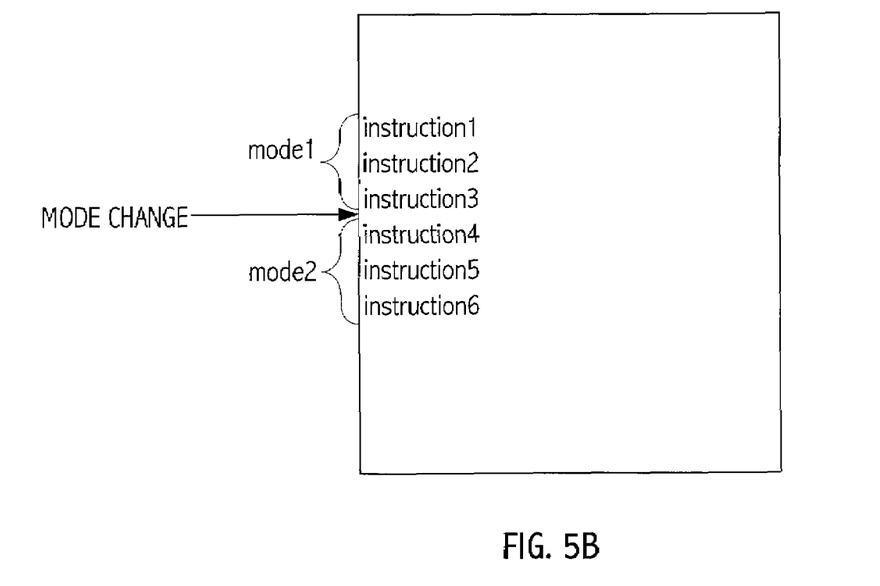
FIG. 5B illustrates an exemplary instruction execution sequence consistent with at least one embodiment of the invention.

Referring to FIGS. 5A and 5B, exemplary instruction flows execute instructions one through three with a memory system in a first power mode. In FIG. 5A, the fourth instruction is a DSC mode change instruction. Prior to issuance of the fifth instruction, the memory power mode changes from the first power mode to a second power mode. Instructions five through seven execute with memory configured in the second power mode. In at least one embodiment of a DSC memory system, the DSC mode change instruction (e.g., instruction four of FIG. 5A) is one instruction in a function or subroutine that evaluates power information (e.g., information received from energy storage devices 101, 501, or 601 and/or sensing circuits 121, 520, or 620, respectively, or other suitable circuits) and effectuates a memory power mode based thereon. In at least one embodiment of a DSC memory system, the mode change instruction is a special-purpose control instruction having a particular opcode. That control instruction may be conditional or unconditional. In at least one embodiment of a DSC memory system, the mode change instruction is a write instruction that modifies the contents of at least one particular control register that effectuates the mode change function. However, the change mode instruction may be any suitable instruction that can effectuate a change in the memory power mode. Referring to FIG. 5B, prior to issuance of the fourth instruction, special-purpose processor hardware changes the memory power mode from the first power mode to a second power mode. Instructions four through six execute with memory configured in the second power mode. In at least one embodiment of the invention, the hardware change to the memory power mode is unrelated to instructions one through six of FIG. 5B.

In at least one embodiment of memory system 100, a processor pipeline is flushed prior to making a memory power mode change. A change in memory power mode may be precise, i.e., instructions entering a processor pipeline prior to the mode change (e.g., instructions issued from a scheduling queue) are completed and those that have not yet entered a processor pipeline prior to the mode change (e.g., instructions not yet scheduled by a scheduling queue) are started after a memory power mode change is completed. In at least one embodiment of memory system 100, instructions already in the pipeline, but not yet completed may be restarted after a memory power mode change is completed. Note that flushing the pipeline and re-synchronizing processor pipelines may be time consuming, thus, the flush and/or synchronization time for a pipeline should be a factor considered when determining a frequency of memory power mode changes.

Figure 6:
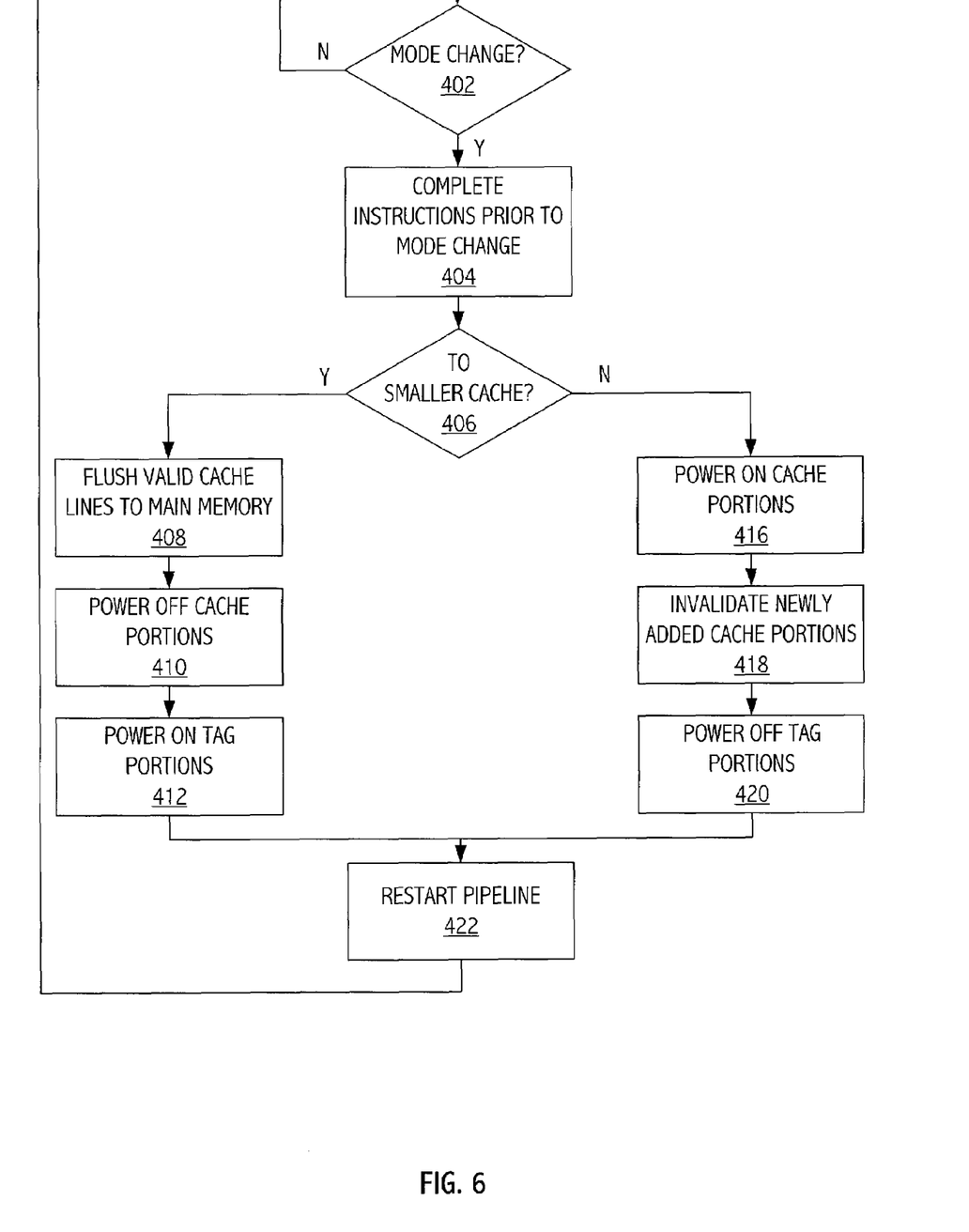
FIG. 6 illustrates information and control flows consistent with at least one embodiment of the invention.

Referring to FIG. 6, upon detecting a mode change (402), a processor including a DSC memory system completes instructions in the pipeline prior to the mode change (404). If the cache is a write-back cache and the memory system is changing from a first mode to a second mode having a smaller cache than the first mode (406), then the processor flushes valid cache lines to main memory (408). In at least one embodiment of a DSC memory system, a flush is not needed because the cache is a write-through cache. Then a portion of the cache memory is powered-off (410) and appropriate portions of the tag memory are powered-on (412). Once the cache is configured consistent with a selected mode, the processor pipeline is restarted (422). If the memory system is changing from a first mode to a second mode having a larger cache than the first mode (406), a processor powers on appropriate portions of the cache memory (416) and invalidates the newly enabled cache portions (418). The processor then powers-down appropriate portions of the tag memory (420). Once the cache is configured consistent with a selected mode, the processor pipeline is restarted (422).

Figure 7A:
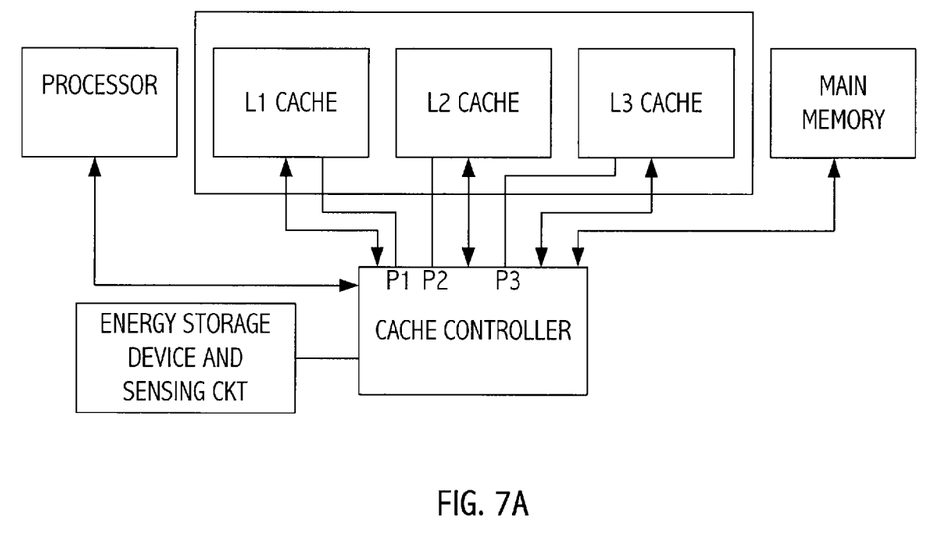
FIG. 7A illustrates a block diagram of a dynamically scalable cache memory system having a first configuration consistent with at least one embodiment of the invention.
Figure 7B:
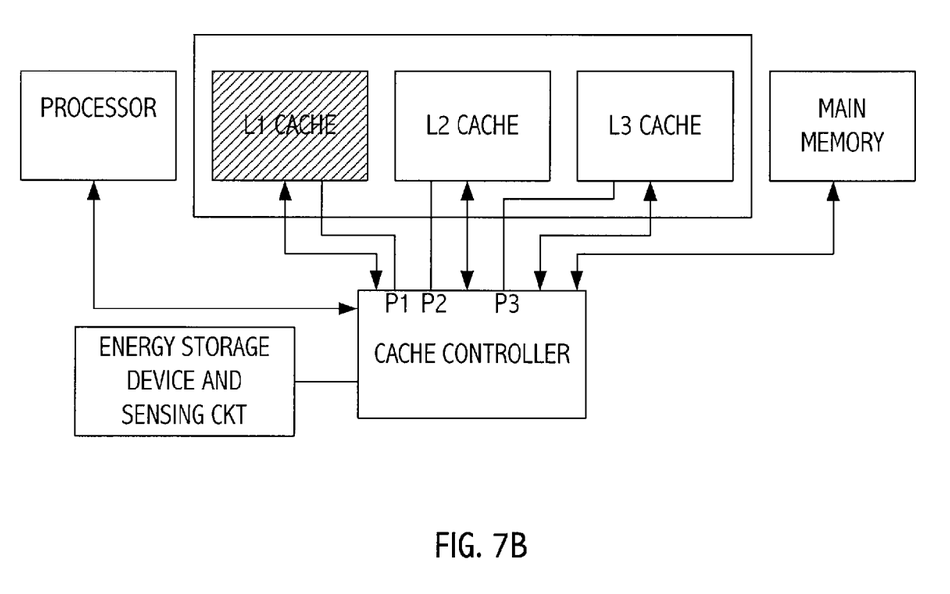
FIG. 7B illustrates a block diagram of the dynamically scalable cache memory system of FIG. 7A having a second configuration consistent with at least one embodiment of the invention.

Techniques described herein may be incorporated into hierarchical cache memory systems, e.g., L2 and L3 cache memory systems. For example, in at least one embodiment of a cache memory system, an individual level may have selectable effective size. In at least one embodiment of the invention, an entire level of the cache (e.g., L1) may be selectively enabled/disabled according to a power mode (e.g., FIGS. 7A and 7B).

While circuits and physical structures are generally presumed, it is well recognized that in modern semiconductor design and fabrication, physical structures and circuits may be embodied in computer-readable descriptive form suitable for use in subsequent design, test or fabrication stages. Structures and functionality presented as discrete components in the exemplary configurations may be implemented as a combined structure or component. The invention is contemplated to include circuits, systems of circuits, related methods, and computer-readable medium encodings of such circuits, systems, and methods, all as described herein, and as defined in the appended claims. As used herein, a computer-readable medium includes at least disk, tape, or other magnetic, optical, semiconductor (e.g., flash memory cards, ROM), or electronic medium.

The description of the invention set forth herein is illustrative, and is not intended to limit the scope of the invention as set forth in the following claims. Variations and modifications of the embodiments disclosed herein, may be made based on the description set forth herein, without departing from the scope and spirit of the invention as set forth in the following claims.

What is claimed is:

1. An apparatus comprising:
a dynamically scalable cache memory circuit including at least one cache memory circuit having an effective cache size selectable from a plurality of cache sizes; and
a control circuit responsive to an energy level indicator of at least an approximate energy level of an energy storage device configured to provide energy to the dynamically scalable cache memory circuit, the control circuit being configured to select the effective cache size based at least in part on the energy level indicator.

2. The apparatus, as recited in claim 1, further comprising;
a plurality of power supply nodes coupled to the dynamically scalable cache memory circuit, individual ones of the plurality of power supply nodes being separately controlled based at least in part on the energy level indicator, to thereby configure the cache memory circuit to have the effective cache size.

3. The apparatus, as recited in claim 2, wherein individual ones of the plurality of power supply nodes are separately controlled to configure an effective size of a tag memory circuit associated with the cache memory circuit.

4. The apparatus, as recited in claim 1, wherein the cache memory circuit comprises:
a plurality of memory elements, a number of active ones of the plurality of memory elements being based at least in part on the effective cache size; and
wherein the dynamically scalable cache memory circuit further comprises a tag memory circuit associated with the cache memory circuit, the tag memory circuit being configurable to provide tag addresses according to the effective cache size.

5. The apparatus, as recited in claim 1, wherein the effective cache size is selected based at least in part on a target power consumption characteristic.

6. The apparatus, as recited in claim 1, wherein a first effective cache size includes a first number of blocks of an individual set of the cache memory circuit and the second effective cache size includes a second number of blocks in the individual set of the cache memory circuit, the first number being greater than the second number.

7. The apparatus, as recited in claim 1, wherein the tag memory circuit includes a plurality of tag memory elements, a number of active ones of the plurality of tag memory elements being based at least in part on the effective cache size, a tag memory size being selectable from at least a first effective tag memory size and a second effective tag memory size.

8. The apparatus, as recited in claim 7, wherein the first effective tag memory size has a first depth and the second effective tag memory size has a second depth, the first depth being greater than the second depth.

9. The apparatus, as recited in claim 8, wherein the first tag memory size has a first width and the second tag memory size has a second width, the first width being less than the second width.

10. The apparatus, as recited in claim 1, wherein the first effective cache size includes a first number of sets of the cache memory circuit and the second effective cache size includes a second number of sets of the cache memory circuit, the first number being greater than the second number.

11. The apparatus, as recited in claim 1, wherein the cache memory circuit is a hierarchical cache memory circuit and individual ones of the plurality of effective cache sizes include different numbers of cache levels.

12. The apparatus, as recited in claim 1, wherein the control circuit includes at least a portion of a processor circuit responsive to at least one instruction that selects the effective cache size of the cache memory circuit.

13. The apparatus, as recited in claim 12, wherein the instruction is a special-purpose control instruction having a particular opcode.

14. The apparatus, as recited in claim 12, wherein the instruction is a write instruction configured to modify the contents of at least one control register.

15. A method comprising:
selectively providing power to a dynamically scalable cache memory circuit to select an effective size of a cache memory circuit in the dynamically scalable cache memory circuit based at least in part on at least an approximate energy level of an energy storage device configured to provide energy to the dynamically scalable cache memory circuit.

16. The method, as recited in claim 15, wherein the selectively providing is based at least in part on a target power consumption characteristic.

17. The method, as recited in claim 15, further comprising:
selectively providing power to a tag memory circuit associated with the cache memory circuit to configure an effective size of the tag memory circuit based at least in part on the energy level.

18. The method, as recited in claim 17, wherein the effective size of the tag memory circuit is selectable from at least a first effective tag memory size and a second effective tag memory size, the first effective tag memory size having a first depth and the second effective tag memory size having a second depth, the first depth being greater than the second depth.

19. The method, as recited in claim 18, wherein the first effective tag memory size has a first width and the second effective tag memory size has a second width, the first width being less than the second width.

20. The method, as recited in claim 15, further comprising:
identifying a change in a target effective cache size; and
completing execution of instructions issued prior to a change to the effective cache size.

21. The method, as recited in claim 20, further comprising:
flushing valid cache lines to main memory; and
selectively powering-off cache memory elements based at least in part on the change to the target effective cache size; and
executing instructions subsequent to a change in the effective cache size.

22. The method, as recited in claim 21, further comprising:
selectively providing power to tag memory elements based at least in part on the change to the target effective cache size.

23. The method, as recited in claim 20, further comprising:
selectively powering-on cache memory elements based at least in part on the change to the target effective cache size;
invalidating the selectively powered-on cache portions; and
executing instructions subsequent to the change to the effective cache size.

24. The method, as recited in claim 23, further comprising:
selectively powering-on tag memory elements based at least in part on the change to the target effective cache size.

25. An apparatus comprising:
cache memory means having a selectable power consumption characteristic; and
means for selecting a power consumption characteristic of the cache memory means based at least in part on an energy level of an energy storage device coupled to provide energy to the cache memory means.

26. The apparatus, as recited in claim 25, further comprising:
means for identifying memory elements stored in the cache memory means based at least in part on a portion of a memory address,
wherein the means for identifying memory elements stored in the cache memory means has a selectable power consumption characteristic.

27. The apparatus, as recited in claim 25, wherein the power consumption characteristic is based at least in part on an effective size of the cache memory means, the effective size being selectable from a first effective cache size and a second effective cache size, the first effective cache size including a first number of blocks of an individual set of the cache memory circuit and the second effective cache size including a second number of blocks in the individual set of the cache memory circuit, the first number being greater than the second number.

28. The apparatus, as recited in claim 25, further comprising:
means for changing the power consumption characteristic of the cache memory means during instruction execution by a processor coupled to the cache memory means.

* * * * *